(12) United States Patent
Gerhard

(10) Patent No.: US 6,514,026 B1
(45) Date of Patent: Feb. 4, 2003

(54) SCREW

(75) Inventor: Anton Gerhard, Nuremberg (DE)

(73) Assignee: Toge-Dübel A. Gerhard KG, Nuremberg (DE)

( * ) Notice: Subject to any disclaimer, the term of this patent is extended or adjusted under 35 U.S.C. 154(b) by 0 days.

(21) Appl. No.: 09/857,702

(22) PCT Filed: Nov. 24, 1999

(86) PCT No.: PCT/EP99/09070
§ 371 (c)(1),
(2), (4) Date: Jun. 8, 2001

(87) PCT Pub. No.: WO00/34671
PCT Pub. Date: Jun. 15, 2000

(30) Foreign Application Priority Data

Dec. 8, 1998 (DE) .......................................... 198 56 512

(51) Int. Cl.[7] ................................................ F16B 25/10
(52) U.S. Cl. ...................... 411/387.4; 411/411; 411/311
(58) Field of Search .............................. 411/386, 387.1, 411/387.4, 311, 417, 418, 423, 411

(56) References Cited

U.S. PATENT DOCUMENTS

| 1,802,560 A | * | 4/1931 | Kerwin |
| 2,200,227 A | * | 5/1940 | Olson |
| 3,479,675 A | * | 11/1969 | Ricca |
| 3,858,942 A | * | 1/1975 | Humlong |
| 5,827,030 A | | 10/1998 | Dicke |
| 6,056,491 A | * | 5/2000 | Hsu |
| 6,086,302 A | * | 7/2000 | Gerhard |

FOREIGN PATENT DOCUMENTS

WO　　WO 98/04842 A1　　2/1998

* cited by examiner

*Primary Examiner*—Flemming Saether
(74) *Attorney, Agent, or Firm*—Browdy and Neimark, P.L.L.C.

(57) ABSTRACT

A screw (1), in particular a concrete screw, for being screwed into a drilled hole (20) comprises a core (2) with a pilot end (3), a lengthwise screw-in direction (5) and a central longitudinal axis (4); and a thread (7), which is designed in a single piece with the core (2) and which comprises a cutting thread (9), the cutting thread (9) extending from the pilot end (3) counter to the lengthwise screw-in direction (5) and having flanks (12, 13), which are substantially parallel to each other, and cutting notches (17), which are open radially outwards; and a standard thread (11), which adjoins the cutting thread (9), with the standard thread (11) substantially having a triangular cross-sectional shape.

29 Claims, 1 Drawing Sheet

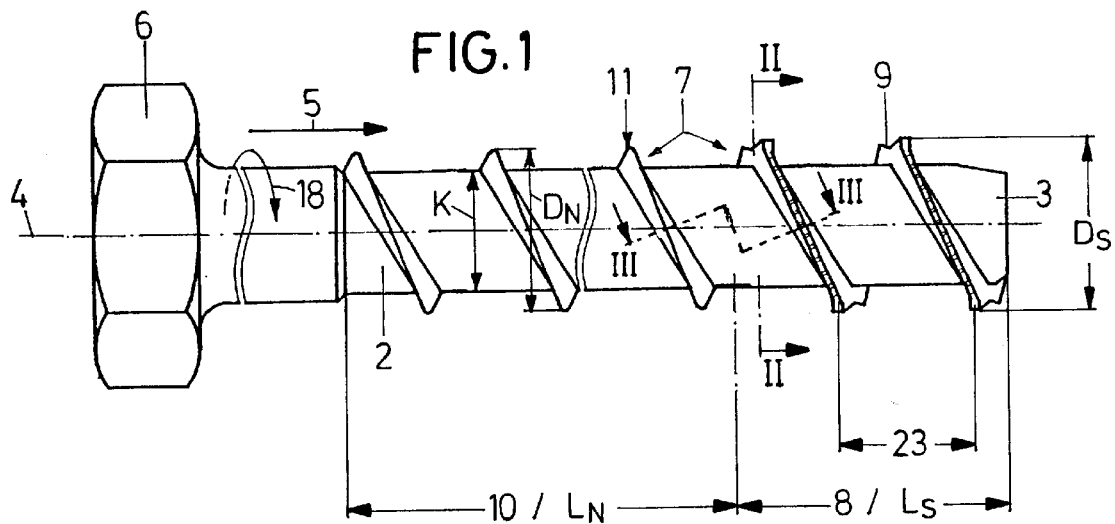
FIG. 1
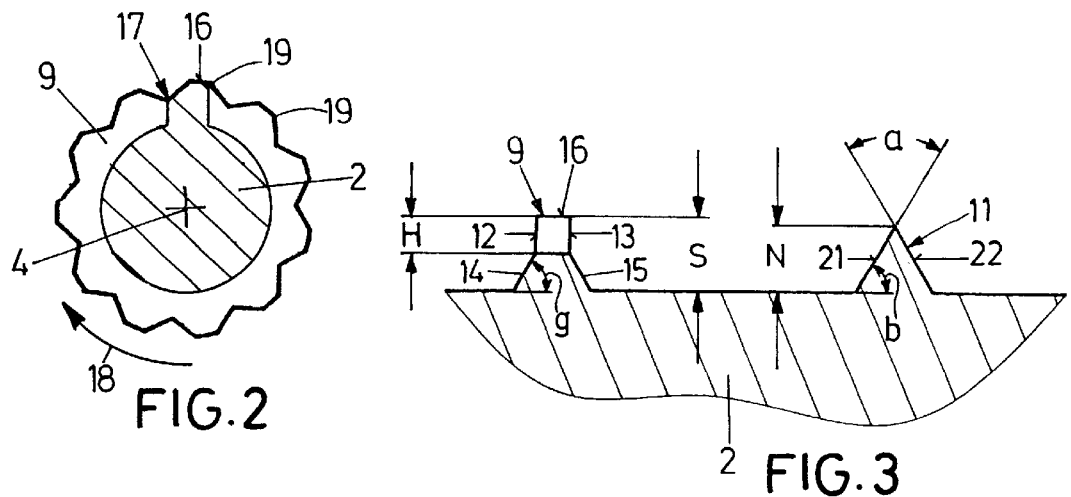
FIG. 2
FIG. 3
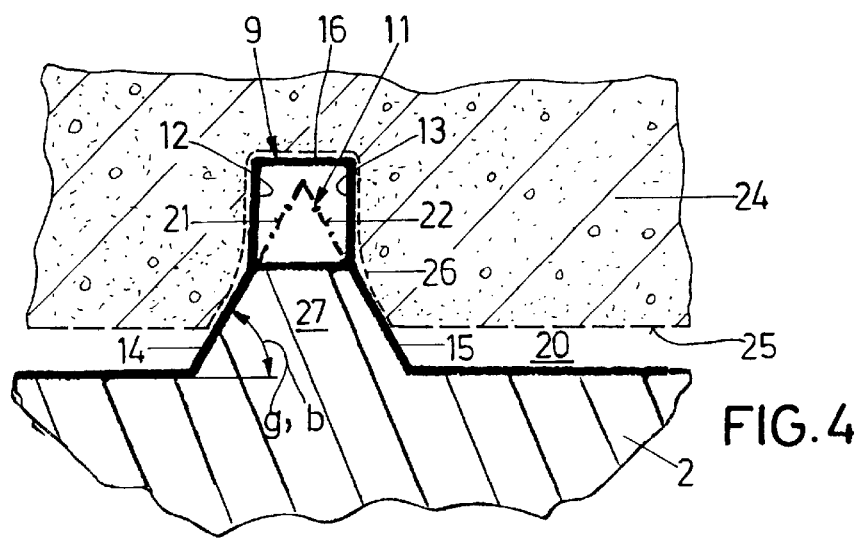
FIG. 4

SCREW

The present application is the national stage under 35 U.S.C. §371 of international application PCT/EP99/09070, filed Nov. 24, 1999 which designated the United States, and which application was not published in the English language.

BACKGROUND OF THE INVENTION

1. Technical Field of the Invention

The invention relates to a screw, in particular a concrete screw, according to the preamble of claim 1.

2. Prior Art

WO 98/04842 teaches a thread forming concrete screw which has a cylindrical core and a thread designed in a single piece with the core. Cutting notches are provided in the vicinity of the outer circumference, which are formed by triangles that are open towards the outer circumference of the thread. Radially of the central longitudinal axis, the flanks of the thread are substantially parallel to each other. The cutting notches are provided only along a section that extends from the pilot end of the screw counter to the lengthwise screw-in direction. This is followed by a thread section without cutting notches which has, however, parallel flanks and the same thread diameter. The concrete screw requires high screw-in moments, in particular for the concrete screw to be completely screwed in.

OBJECT AND SUMMARY OF THE INVENTION

U.S. Pat. No. 5,827,030 teaches a thread-forming screw of the generic type which, starting from its tip, comprises a cutting thread with cutting notches and an adjoining standard thread of substantially triangular cross-sectional shape.

The gist of the invention resides in that a cutting thread is provided that forms an internal thread in a drilled hole. The cutting thread is adjoined by a standard thread that tapers off radially towards the outer circumference of the thread.

It is an object of the invention to further develop a concrete screw of the generic type so that it can be screwed in more easily without any loss of stability under tensile load.

This object is attained by the characterizing features of claim 1. The gist of the invention resides in that a cutting thread is provided that forms an internal thread in a drilled hole. The cutting thread is adjoined by a standard thread that tapers off radially towards the outer circumference of the thread.

The advantage of the further features resides in that the diameter $D_N$ of the standard thread is smaller than the diameter $D_S$ of the cutting thread so that, when the screw is screwed in, the friction exercised by the standard thread on the wall is inferior to the friction exercised by the cutting thread on the wall.

BRIEF DESCRIPTION OF THE DRAWINGS

Further details and advantages of the invention will become apparent from the ensuing description, taken in conjunction with the drawing, in which FIG. 1 is a plan view of a screw according to the invention with a cutting thread and a standard thread;

FIG. 2 is a view along the line II—II of FIG. 1;

FIG. 3 is a view along the line III—III of FIG. 1; and

FIG. 4 is a combined illustration, on an enlarged scale, of a cutting thread and a standard thread in a view corresponding to FIG. 3.

DETAILED DESCRIPTION OF THE PREFERRED EMBODIMENT(S)

A screw 1, in particular a concrete screw, comprises a substantially cylindrical core 2 with a pilot end 3, a central longitudinal axis 4 and a lengthwise screw-in direction 5. The end of the core 2 that is turned away from the pilot end 3 is provided with a screw head 6 of arbitrary design. The core 2 may be beveled in the vicinity of the pilot end 3. Instead of a cylindrical design, it is also conceivable to have the core 2 taper off conically.

Designed in a single piece with the core 2 is a thread 7 which, seen from the pilot end 3 counter to the lengthwise screw-in direction 5, has a cutting thread 9 along a cutting-edge section 8 and an adjoining standard thread 11 along a thread section 10. The axial length of the cutting-edge section 8 is denoted by $L_S$ and the axial length of the thread section 10 by $L_N$.

The cutting thread 9 has flanks 12, 13 which are substantially parallel to each other, passing into the core 2 by way of a bevel 14 and 15, respectively. In the vicinity of its outer circumference, the cutting thread 9 has an approximately rectangular cross-sectional shape. This implies that the flanks 12, 13 corner by an angle of 1° to maximally 2° in order for the thread 9 to be detachable from the manufacturing tool during production. Such a minute flank angle is conditioned exclusively by production technique. The height of the cutting thread 9 as compared to the outer circumference of the core 2 is denoted by S in the following. The angles made by the bevels 14, 15 and the central longitudinal axis 4 are denoted by g. $25° \leq g \leq 75°$, and in particular $40° \leq g \leq 60°$, applies to the angle g. Along its outer circumference, the cutting thread 9 has an outer surface 16 which corresponds to a screw surface on a cylinder with the central longitudinal axis 4. Along its outer circumference, the cutting thread 9 has cutting notches 10 which are open radially outwardly, having the shape of a triangle that is open towards the outer circumference. The edges 19, which are located between the outer surfaces 16 and the cutting notches 17 and which lead in the screw-in direction of rotation 18, are cutting edges 19 and will be designated as such on the following. The precise design as well as the dimensioning of the cutting notches 17 relative to the other proportions in size of the screw 1 and relative to a drilled hole 20 into which to screw the screw 1, are known from WO 98/04842, and in particular from the table included therein, to which reference is made. The cutting notches 17 have a radial height H. $0.3 \leq H/S \leq 0.7$, and in particular $0.4 \leq H/S \leq 0.5$, applies to the proportion of the heights H and S. The cutting thread 9 has a diameter $D_S$ which exceeds the nominal diameter of the drilled hole 20 by 1.0 to 2.5 mm. The core 2 has a diameter K which is by 2.0 to 0.8 mm less than the nominal diameter of the drilled hole 20.

The standard thread 11 has flanks 21, 22 that corner by an angle a to which $40° \leq a \leq 100°$, and in particular $50° \leq a \leq 80°$ applies. An angle a=60° is especially preferred. In a central longitudinal section, the standard thread 11 has a triangular cross-sectional shape, tapering off towards the outer circumference of the standard thread 11. Cutting notches 17 are not provided. The standard thread 11 has a height N as compared to the outer circumference of the core 2. The diameter of the standard thread 11 is denoted by $D_N$.

FIG. 4 shows a combined illustration of the cutting thread 9 and the standard thread 11 in a view according to FIG. 3. The flanks 21, 22 of the standard thread 11 are designed such that, in a central longitudinal cross section, they are congruent with the bevels 14 and 15, respectively.

Consequently, the angle b made by the flanks 21, 22 and the central longitudinal axis 4 is identical with the angle g. 0.5 mm≦S–N≦1 mm, and in particular 0.2 mm≦S–N≦0.5 mm, applies to the difference of the heights S and N. In the illustrations according to FIGS. 3 and 4, the flanks 12 and 13 of the cutting thread 9 and the central longitudinal axis 4 make the same angle in each case. This is also true for the flanks 21 and 22 of the standard thread 11. However, it is also possible to provide an arrangement in which the included angles will differ. As for the length $L_N$ and $L_S$ ratio, 1≦$L_N/L_S$≦15 applies, and in particular 2.5≦$L_N/L_S$≦3.5. The length $L_S$ is selected such that the cutting-edge section 8 reaches over approximately two thread flights 23. As for the difference of the diameters $D_S$ and $D_N$, 0.1 mm<$D_S$–$D_N$≦2 mm applies, and in particular 0.4 mm<$D_S$–$D_N$≦1 mm. The diameter of the cutting thread 9 increases continuously along approximately a thread flight 23 until it reaches the diameter $D_S$, with the height of the cutting thread 9 tending towards zero at the pilot end 3.

It is possible to design the standard thread 11 such that it tapers in a direction opposite to the lengthwise screw-in direction 5. As opposed to a maximal diameter $D_N$ of the standard thread 11, the taper is then towards 90% to 99.9%, in particular 98% to 99.5%, of $D_N$.

When the screw 1 is screwed into a wall 24 that comprises the drilled hole 20, the cutting edges 19 of the cutting thread 9 first engage with the wall 25 of the drilled hole 20. The cutting and reaming action of the cutting thread 9 as well as of the wall material already worked off helps produce an internal thread 26 in the wall 24. The bevels 14 and 15 ensure that the cutting thread 9 is not torn off the core 2 by the forces acting during the screw-in job. The internal thread 26 does not precisely suit with the contour of the bevels 14, 15 and the flanks 12, 13; rather, as seen in FIG. 4, a continuous transition in the area between the bevels 14, 15 and the flanks 12, 13 is produced by wall material breaking off. If the screw 1 is screwed in further, the standard thread 11 contacts the internal thread 26. However, the part of the standard thread 11 that is shown by a dot-dashed line in FIG. 4 is free so that it does not ream against the wall 25 of the drilled hole 20. On the one hand, this helps reduce the necessary moment of screwing in. On the other hand, the frictional force directed towards the wall 25 is imparted in the vicinity of the base 27 of the standard thread 11, there being no risk of the standard thread 11 coming off the core 2. The same is true for the absorption and transmission of forces when tensile load acts on the screw 1 counter to the lengthwise screw-in direction 5. The area of the base 27 is cut free by the cutting notches 17 along the first flight 23, starting from the pilot end 3, along which the diameter of the cutting thread 9 grows continuously.

What is claimed is:

1. A screw for being screwed into a wall (25) of a drilled hole (20), comprising a core (2), which has a pilot end (3), a lengthwise screw-in direction (5) and a central longitudinal axis (4); and a thread (7), which forms a single piece with the core (2) and which comprises a cutting thread (9), which extends from the pilot end (3) in a direction opposite to the lengthwise screw-in direction (5), having cutting notches (17), which are open radially outwards;

a standard thread (11), which adjoins the cutting thread (9) and substantially has a triangular cross-sectional shape;—wherein the cutting thread (9) has flanks (12, 13), which are substantially parallel to each other;

wherein the core (2) is substantially cylindrical; and wherein the cutting thread (9) has a height S as compared to the outer circumference of the core (2); and wherein the standard thread (11) has a height N as compared to the outer circumference of the core (2), with S>N applying.

2. A screw according to claim 1, wherein the standard thread (11) has flanks (21, 22), which corner by an angle a to which applies: 40°≦a≦100°.

3. A screw according to claim 2, wherein the standard thread (11) has flanks (21, 22), which corner by an angle a to which applies: 50°≦a≦80°.

4. A screw according to claim 3, wherein the standard thread (11) has flanks (21, 22), which corner by an angle a to which applies: a~60°.

5. A screw according to claim 1, wherein each flank (12, 13) of the cutting thread (9) passes into the core (2) by means of a bevel (14, 15).

6. A screw according to claim 1, wherein 25°≦g≦75° applies to the angle g made by the central longitudinal axis (4) and the bevel (4, 15).

7. A screw according to claim 6, wherein 40°≦g<60° applies to the angle g made by the central longitudinal axis (4) and the bevel (14, 15).

8. A screw according to claim 5, wherein the cross section of the bevels (14, 15) is congruent with the cross section of the flanks (21, 22) of the standard thread(11).

9. A screw according to claim 1, wherein 0.05 mm≦S–N<1 mm applies to the difference of the heights S and N.

10. A screw according to claim 9, wherein 0.2 mm<S–N<0.5 mm applies to the difference of the heights S and N.

11. A screw according to claim 1, wherein the cutting thread (9) has an outside diameter $D_S$ and the standard thread (11) has an outside diameter $D_S$, to which applies: $D_S>D_N$.

12. A screw according to claim 11, wherein the cutting thread (9) has an outside diameter $D_S$ and the standard thread (11) has an outside diameter $D_N$, to which applies: 0.1 mm<$D_S$–$D_N$<2 mm.

13. A screw according to claim 1, wherein the cutting notches (17) have a radial height H, with 0.3<H/S<0.7 applying to the height H and S ratio.

14. A screw according to claim 13, wherein the cutting notches (17) have a radial height H, with 0.4≦H/S≦0.5 applying to the height H and S ratio.

15. A screw according to claim 1, wherein the standard thread (11) has a maximal diameter $D_N$, with the diameter of the standard thread (11) tapering towards 90% to 99.9% of $D_N$ in the direction opposite to the lengthwise screw-in direction(5).

16. A screw according to claim 15, wherein the standard thread (11) has a maximal diameter $D_N$, with the diameter of the standard thread (11) tapering towards 98% to 99.5% of $D_N$ in the direction opposite to the lengthwise screw-in direction(5).

17. A screw for being screwed into a wall (25) of a drilled hole (20), comprising a core (2), which has a pilot end (3), a lengthwise screw-in direction (5) and a central longitudinal axis (4); and a thread (7), which forms a single piece with the core (2) and which comprises a cutting thread (9), which extends from the pilot end (3) in a direction opposite to the lengthwise screw-in direction (5), having cutting notches (17), which are open radially outwards; and a standard thread (11), which adjoins the cutting thread (9) and substantially has a triangular cross-sectional shape;

wherein the cutting thread (9) has flanks (12, 13), which are substantially parallel to each other;

wherein the core (2) is substantially cylindrical;

wherein the cutting thread (9) has a height S as compared to the outer circumference of the core (2); and wherein the standard thread (11) has a height N as compared to the outer circumference of the core (2), with S>N applying.

18. A screw according to claim 17, wherein 0.05 mm≦S−N<1 mm applies to the difference of the heights S and N.

19. A screw according to claim 18, wherein 0.2 mm<S−N<0.5 mm applies to the difference of the heights S and N.

20. A screw according to claim 17, wherein the cutting thread (9) has an outside diameter $D_S$ and the standard thread (11) has an outside diameter $D_S$, to which applies: $D_S > D_N$.

21. A screw according to claim 20, wherein the cutting thread (9) has an outside diameter $D_S$ and the standard thread (11) has an outside diameter $D_N$, to which applies: 0.1 mm<$D_S$−$D_N$<2 mm.

22. A screw according to claim 17, wherein the cutting notches (17) have a radial height H, with 0.3<H/S<0.7 applying to the height H and S ratio.

23. A screw according to claim 22 wherein the cutting notches (17) have a radial height H, with 0.4≦H/S≦0.5 applying to the height H and S ratio.

24. A screw according to claim 17, wherein the standard thread (11) has flanks (21, 22), which corner by an angle a to which applies: 40°≦a≦100°.

25. A screw according to claim 25, wherein the standard thread (11) has flanks (21, 22), which corner by an angle a to which applies: 50°≦a≦80°.

26. A screw according to claim 25, wherein the standard thread (11) has flanks (21, 22), which corner by an angle a to which applies: a~60°.

27. A screw according to claim 17, wherein each flank (12, 13) of the cutting thread (9) passes into the core (2) by means of a bevel (14, 15).

28. A screw according to claim 27, wherein 25°≦g≦75° applies to the angle g made by the central longitudinal axis (4) and the bevel (14, 15).

29. A screw according to claim 28, wherein 40°≦g≦60° applies to the angle g made by the central longitudinal axis (4) and the bevel (14, 15).

* * * * *